May 25, 1926.
W. C. STARKEY
SHOCK ABSORBER
Filed July 15, 1925
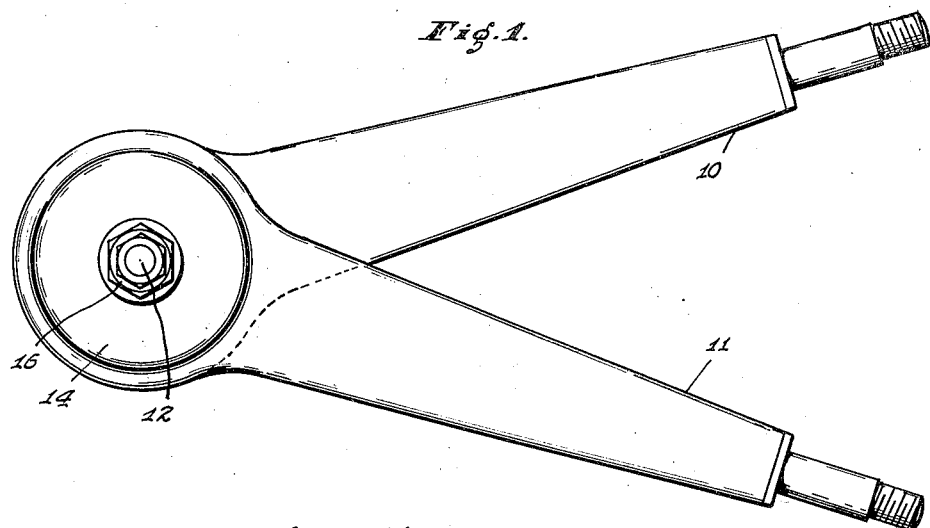
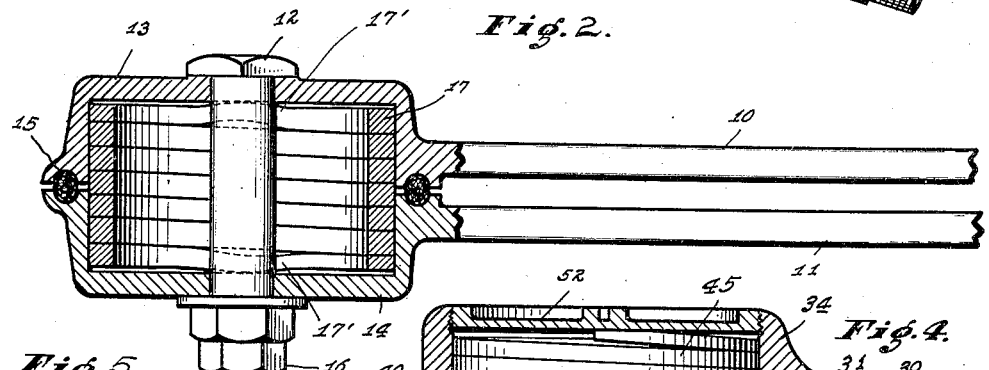
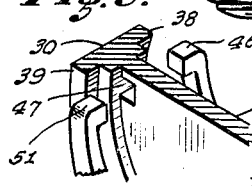
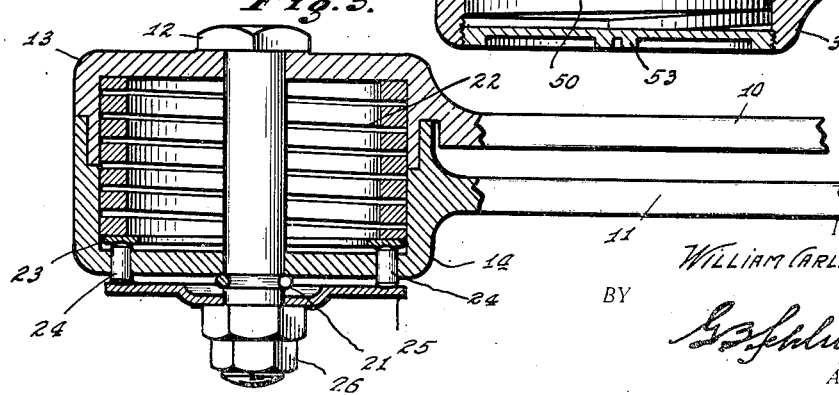
INVENTOR.
WILLIAM CARLETON STARKEY,
BY
ATTORNEY.

Patented May 25, 1926.

1,585,797

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

SHOCK ABSORBER.

Application filed July 15, 1925. Serial No. 43,712.

It is the object of my invention to produce a shock absorber for automobiles or other vehicles, which shock absorber will permit free relative movement of the automobile frame and axle toward each other but will provide a frictional drag when such two parts tend to separate on rebound. A further object of my invention is to construct such a shock absorber which will embody but few parts and will be simple and economical to manufacture.

I accomplish the above object by providing two rotatable members which rotate relatively to each other as the automobile frame and axle move relatively to each other; and I provide one of such members with a circular recess in which there is a helically coiled spring adapted to engage operatively the other member and to bear against the cylindrical wall of the aforesaid recess.

The accompanying drawing illustrates my invention: Fig. 1 is a side elevation of my shock absorber; Fig. 2 is a horizontal central section through the shock absorber of Fig. 1; Fig. 3 is a horizontal central section illustrating a modification of my invention; Fig. 4 is a horizontal central section illustrating a further modification; and Fig. 5 is a fragmental perspective view of the modification shown in Fig. 4.

My shock absorber comprises two arms 10 and 11 pivotally connected together at one end by a bolt 12 and adapted at their other ends to be connected respectively to an automobile frame and axle or to any two parts of an automobile which tend to separate on rebound. Suitable means for effecting this connection are well known and form no part of my invention. The inner ends of the levers 10 and 11 form cup-shaped portions 13 and 14 respectively, the interiors of such cups forming opposed recesses through the center of which passes the bolt 12. The opposed cup-rims are provided with annular grooves for the reception of suitable compressible packing 15, and the bolt 12 is provided with a nut 16 by means of which the two cups 13 and 14 may be held together and drawn toward each other to control the operation of the shock absorber.

Located in the aforesaid recesses is a helically wound spring 17 which has a slightly larger normal external diameter than that of the recesses, so that the spring will be compressed when placed in the recesses and will bear against the side walls thereof. A portion of each end turn of the spring 17 is displaced axially outward as indicated at 17', such outwardly displaced portions bearing against the bottoms of the cups 13 and 14.

It will be evident that as the outer ends of the arms 10 and 11 approach each other the two cups 13 and 14 will rotate relatively in a direction tending to wind the spring 17 thus causing the spring to become reduced in diameter and to permit free relative rotation of the arms 10 and 11. Under rebound, as the outer ends of the two arms 10 and 11 separate, the two cups 13 and 14 will be rotated in a direction tending to unwind the spring 17, thus causing such spring to be forced into contact with the walls of its associated recesses. The friction thus induced between the spring 17 and the inner surfaces of the cups 13 and 14 acts to retard and oppose the separation of the arms 10 and 11, thus checking the rebound.

It will be evident that the magnitude of the retardation produced on rebound by the friction between the spring and the walls of its associated recesses is dependent upon the proportions of the spring 17. For instance, altering the diameter of the recesses in the cups 13 and 14 and of the spring 17 will change the effective lever arm of the frictional drag between these two parts and thus will increase the retarding effect; or increasing the cross-sectional area of the material of which the spring is formed will result in a greater radial pressure between the spring and the inner walls of the cups 13 and 14 before the spring starts to slip relative to such walls. The same result can be accomplished by increasing slightly the normal outer diameter of the spring 17 so that when in place in the recesses it bears with greater force against their walls.

In the device illustrated in Fig. 2, the retarding effect produced on rebound may be controlled by adjustment of the nut 16, tightening of which tends to flatten the arched portions 17' of the spring 17 and increases the friction between the spring-ends and the cup-bottoms. This increase of friction increases the tendency of the spring to unwind on rebound and hence increases the retarding effect produced on rebound.

In Fig. 3 is illustrated a modification of my invention in which other means are provided for varying the retarding effect. This shock absorber embodies the arms 10 and 11, bolt 12, and cups 13 and 14, substantially the same as the correspondingly numbered parts shown in Fig. 2. The two cups 13 and 14 are held together by means of a split ring 21 which lies in a groove in the bolt 12 and bears against the outer surface of the cup 14.

Located in the recesses formed by the cups 13 and 14 is a spring 22 which differs from the spring 17 shown in Fig. 2 in that it is open-wound, whereas the spring 17 is a close-wound spring except for the outwardly displaced portion 17'. If the spring 22 is compressed axially, it will tend to expand in diameter and bear with greater force against the walls of its associated recesses. Variation of this force will cause a corresponding variation in the retarding effect produced by the shock absorber on rebound. To control the effective pressure between spring and recess walls, I provide a washer 23 adapted to bear against one end of the spring 22, the other end of such spring being seated against the bottom of the recess in the cup 13. Passing through the bottom wall of the cup 14 and bearing against the washer 23 are a plurality of pins 24, whose outer ends engage a washer 25 which may be forced inwardly by means of a nut 26 on the end of the bolt 12. By adjusting the position of the nut 26, the spring 22 is compressed axially or is permitted to increase in length, thus varying the force with which it bears against the inner walls of the cups 13 and 14. By varying the pressure between the spring turns and the recess walls, the retardation produced on rebound may be correspondingly varied.

The shock absorbers illustrated in Figs. 2 and 3 have a slight disadvantage in that the forces acting on the ends of the arms 10 and 11 have a tendency to twist the shock absorber about a horizontal axis transverse to that of the bolt 12. This tendency can be readily overcome by means of the construction illustrated in Figs. 4 and 5, in which I provide two oppositely wound springs in order to eliminate the twisting tendency present in the constructions illustrated in Figs. 2 and 3.

In the modification illustrated in Figs. 4 and 5, the inner end of the arm 10 is enlarged to form a hub 30 in the opposite axial faces of which are recesses separated by a central web 31. The arm 11 is formed of two axially separable parts 32 and 33 whose inner ends terminate in sleeves 34 and 35 provided with central bores which, when the arm-parts 32 and 33 are assembled on the arm 10, will be alined with the recesses in the hub 30. The parts 32 and 33 may be held together by one or more bolts 36 passing through ears or flanges on the sleeves 34 and 35 and by one or more bolts 37 passing through those portions of the parts 32 and 33 which form the arm 11. Preferably, the hub 30 is provided with axially extending flanges 38 and 39 mating with flanges 40 and 41 on the sleeves 34 and 35.

Located in the bore in the sleeve 34 is a helically wound spring 45 which extends into the corresponding recess in the hub 30 and is there provided with an outwardly turned end 46 which enters an opening 47 cut in the central web 31. A spring 50, similar to the spring 45 but oppositely wound, is located in the sleeve 35 and extends into the corresponding recess in the hub 30 and is provided with an outwardly turned end 51 which enters the opening 47 in the web 31. This positive connection of the springs 45 and 50 to the arm 10 is desirable in order to decrease the axial length of the hub 30; as otherwise, the recesses in the opposite faces of such hub would have to be materially deeper.

A portion of the outer turn of each spring 45 and 50 is bent axially outward. These outwardly bent ends bear respectively against the inner faces of the plugs 52 and 53 which are screw-threadedly mounted in the outer ends of the sleeves 34 and 35. These screw-threaded plugs 52 and 53 may be adjusted to vary the pressure they exert on the outwardly displaced ends of the springs 45 and 50. The variation in this pressure varies the tendency of the coil springs to expand when the sleeves 34 and 35 rotate relatively to the hub 30 in a direction to cause the springs to unwind, and thus varies the retarding effect exercised by the shock absorber on rebound.

In all the above described modifications, the retardation on rebound is produced by the friction between the coil spring and its associated recesses. The magnitude of this retardation is dependent upon the proportions of the coil spring, but may be varied by any of the methods shown.

For the best operation the recesses in which the coil springs are located should be filled with a suitable grease. I have found that with proper lubrication the frictional drag produced by my shock absorber increases as the arms rotate relatively in a direction to unwind the spring. This increase is probably due to the gradual expulsion of the lubricant film between the spring and the recess walls or to the fact that the turns of the spring come into action successively or to both causes. When the shock absorber arms oscillate rapidly with small amplitude, the coil springs exercise but little retardation; but on rebounds of large amplitude, the shock absorber imposes a frictional drag which gradually increases to several times its initial value.

I claim as my invention:—

1. A shock absorber, comprising two relatively rotatable members, one of said members having an axial circular recess, a coil spring located in said recess and operatively engaged with the other of said members, and means for positively connecting said two members respectively with two parts of a vehicle which separate on rebound so that on rebound said two members will rotate relatively in a direction tending to unwind said spring to cause it to expand and bear against the wall of its associated recess.

2. A shock absorber as set forth in claim 1 with the addition of means for adjusting the pressure exerted during rebound by said spring on the walls of its associated recess.

3. A shock absorber, comprising two arms pivotally connected together, an axial circular recess in one of said arms, a coil spring located in said recess and operatively engaged with the other of said arms, said two arms being adapted to be connected to two parts of a vehicle which separate on rebound so that on rebound said arms will rotate relatively in a direction to unwind said spring to cause it to expand and bear against the wall of its associated recess.

4. A shock absorber as set forth in claim 3 with the addition of means for adjusting the pressure exerted during rebound by said spring on the walls of its associated recess.

5. A shock absorber as set forth in claim 1 with the addition of means for applying axial pressure to said spring to vary the lateral pressure it exerts during rebound against the wall of its associated recess.

6. A shock absorber, comprising two relatively rotatable members, two oppositely coiled helical springs operatively engaged with one of said members on opposite axial faces thereof and extending into axial circular recesses in the other of said members, and means for positively connecting said two members respectively to two parts of a vehicle which separate on rebound so that on rebound said two members will rotate relatively in a direction tending to unwind said springs to cause them to expand and bear against the walls of their associated recesses.

In witness whereof, I have hereunto set my hand at Indianapolis, Indiana, this eighth day of July, A. D. one thousand nine hundred and twenty-five.

WILLIAM CARLETON STARKEY.